United States Patent [19]

Bracke et al.

[11] 4,148,117
[45] Apr. 10, 1979

[54] ELECTRON BUN OPTICAL ADJUSTMENT APPARATUS AND METHOD

[75] Inventors: Pieter Bracke, Aichwald; Dieter Forker, Esslingen-Mettingen; Dieter Kropsch, Köngen, all of Fed. Rep. of Germany

[73] Assignee: International Standard Electric Corporation, New York, N.Y.

[21] Appl. No.: 765,702

[22] Filed: Feb. 4, 1977

[51] Int. Cl.² ............................. H01J 9/18; H01J 9/42
[52] U.S. Cl. ...................................... 29/25.16; 316/1; 316/23; 316/29
[58] Field of Search ................................ 316/23, 29, 1; 29/25.13, 25.15, 25.16

[56] References Cited
U.S. PATENT DOCUMENTS

| | | | |
|---|---|---|---|
| 3,194,626 | 7/1965 | Hoffmann | 316/23 |
| 3,816,891 | 6/1974 | Fassett | 316/29 |
| 3,962,764 | 6/1976 | Stewart et al. | 29/25.13 |
| 3,962,765 | 6/1976 | Stachel et al. | 29/25.13 |

*Primary Examiner*—Richard B. Lazarus
*Attorney, Agent, or Firm*—John T. O'Halloran; Jeffrey P. Morris

[57] ABSTRACT

An optical adjusting method and apparatus for aligning the electron gun system in color television picture tubes during the sealing process. The electron gun system and the picture tube prior to assembly are separated from each other with the electron gun system being supported for rotation about its longitudinal axis and having optically effective position marks which may comprise slots or columns thereon for aligning the electron gun system in a predetermined alignment. A light beam traverses the position marks which, in the electron gun system, when properly rotated, coincides with the axis between a light source and a light intensity measuring means such that the electron gun system is aligned in its predetermined alignment when a maximum light intensity with respect to a predetermined threshold is detected.

23 Claims, 8 Drawing Figures

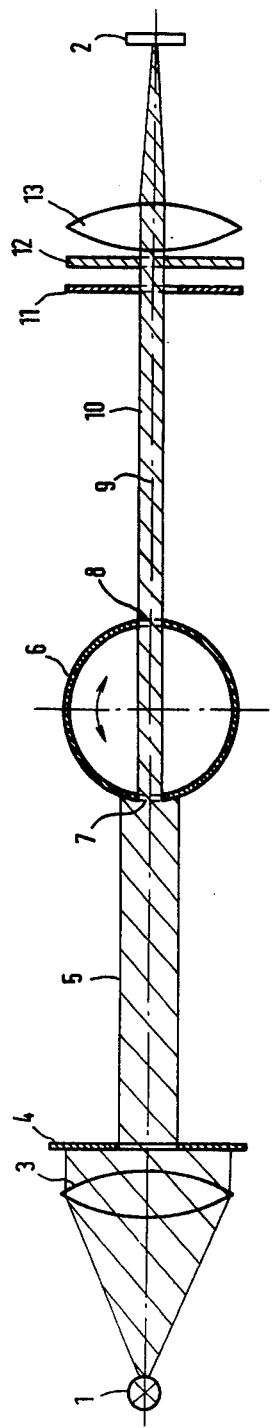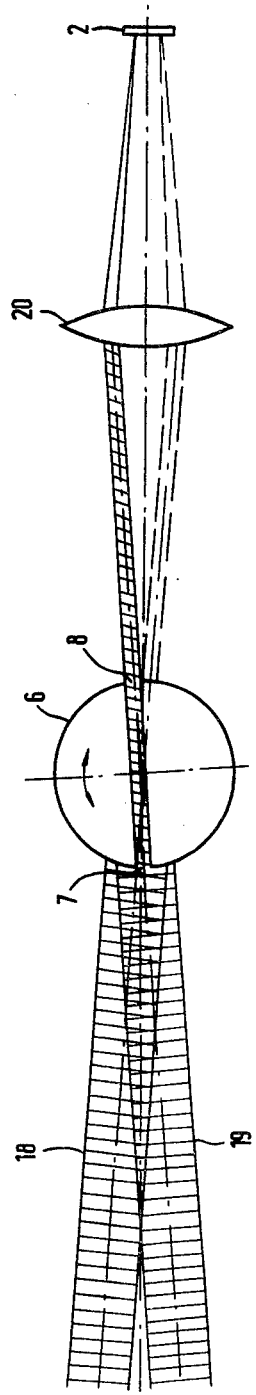

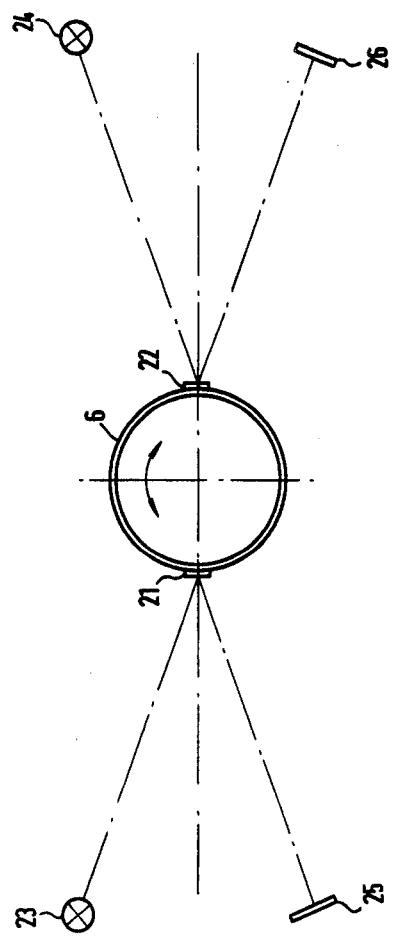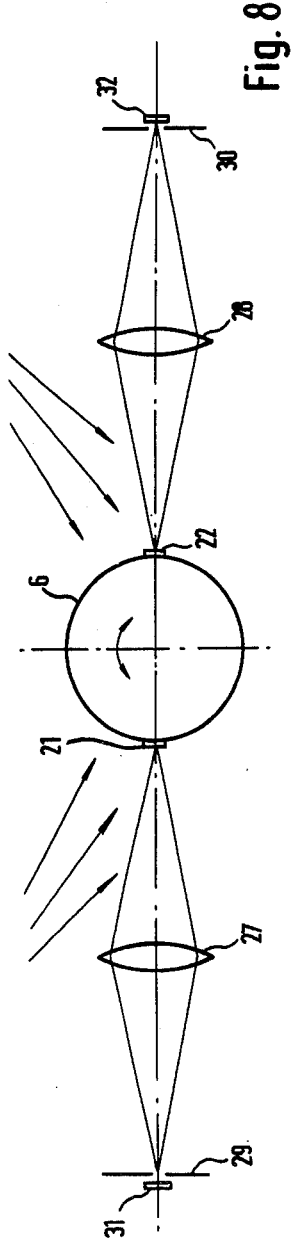

ELECTRON BUN OPTICAL ADJUSTMENT APPARATUS AND METHOD

BACKGROUND OF THE INVENTION

The present invention relates to apparatus and method of aligning the electron gun system of a multi-cathode-ray tube, in particular of a color television picture tube, with respect to the phosphor dots on the screen-plate thereof, in which the electron gun system as compsed of several guns, as well as the picture tube, prior to the assembly, are separated from one another and positioned in a sealing device, and in which the electron gun system is supported in this sealing device capable of being turned about its longitudinal centerline axis.

Present color tv picture tubes have a display screen with phosphor dots emitting light in the three primary colors, red, green and blue, and, in the proximity thereof, a color selecting electrode extending substantially parallel in relation thereto. The phosphor dots are deposited, for example, in the course of a photochemical process, and their positions on the screen-plate are exactly defined with respect to the axes of the individual systems or electron gun associated therewith. The landing points of the electron beams on the screen-plate must exactly coincide with the phosphor dots associated therewith.

In the case of color tv picture tubes in which the electron guns are arranged, e.g., in a triangle (so-called delta tubes) the electron gun system must be fixed in such a way inside the neck portion of the picture tube that it is turned by less than 3° with respect to the position of the phosphor dots on the screen-plate.

In the case of color television tubes in which the electron guns are arranged in one line next to each other (in-line arrangement), and in which there are not used, e.g., any special dynamic convergence means, it is necessary to provide for a more exact position definement.

In one conventional method used in connection with color tv picture tubes employing a delta arrangement of the electron guns, the contact pins in the pressed glass base are used as marks for aligning the electron gun system. These contact pins are connected by metal wires or metal tapes to the electron guns, so that the electron gun system forms one structural unit together with the pressed glass base. It can easily happen, however, that the thin metal wires or metal tapes are bent, so that there is caused a misalignment of the system with respect to the pressed glass base and, consequently, also with respect to the phosphor dots on the screen-plate, with this misalignment being greater than admissible.

The German Offenlegungsschrift (DT-OS) No. 23 54 338 (U.S. Pat. application Ser. No. 302,587, filed 10/31/72 of J. F. Segro and G. L. Fassett, RCA); discloses a method according to which the electron gun system is aligned with the aid of a reference plane extending through the center points of at least two passage holes for the electron beams in an accelerating and focusing grid. This grid is composed of two cap-shaped parts meeting against each other with their bottom parts. In these bottom parts there are provided the passage holes for the electron beams. The cap-shaped parts of the grid for use with in-line picture tubes have, e.g., flattened side portions extending in parallel with the plane extending through the center axes of the electron guns. Two mechanical gauges in the form of displaceable rods are brought into contact with one of these side parts when both the electron gun system and the picture tube are positioned separately from one another in the sealing device. These gauges serve to measure the distance of the contacting points at the side part from a reference plane representing the ideal position of the electron gun system with respect to the screen-plate. By a comparator it is made possible to make the two measured distances alike by turning the electron gun system about its longitudinal centerline axis. The viewing plane as fixed by the two points of contact, will then be in parallel with the reference plane. The tolerance of turning the electron gun system is at about 0.5° or below.

The disadvantage of such a mechanical alignment is seen in that by the application of the mechanical gauges to the electron gun system, the latter can be easily twisted (turned) or bent and damaged. In order to be able to perform an exact measurement, the two gauges must be at a large as possible lateral spacing from one another. Owing to a possible parallel offset of the pressed glass base and the electron gun system with respect to one another, when assembled, it may easily happen that one of the gauges will come in touch with the rim portion on the flat side portion of the grid, or even beyond the latter, which may falsify the measurement and, under certain circumstances, may even cause the electron gun system to be damaged.

SUMMARY OF THE INVENTION

In accordance with the present invention, a method and apparatus for aligning the electron gun system with respect to the screen-plate of a color tv picture tube is provided when both the electron gun system and the picture tube are still positioned separately from one another in the sealing device, and which method and apparatus avoids the aforementioned disadvantages of the prior art.

This is achieved in that the position marks as provided for on the electron gun system, are optically effective marks, with these marks being illuminated by one or more light sources, that the light as impinging upon said marks is evaluated with the aid of one or more receivers, and that the position of the electron gun system is corrected in dependence upon the measuring result as obtained.

The present invention offers the advantage of using a non-contacting measuring technique permitting the measuring or sensing heads containing the light sources and the receivers, to be stationarily arranged at the sealing device at a sufficient spaced relation from the through-going spindle for receiving the electron gun system, thus preventing the electron gun system from being damaged during the alignment process. Moreover, it is still possible to perform a more exact adjustment, because this method permits to indicate turning movements in the order of about 0.1°.

Further objects and advantages of the invention will become apparent from the following detailed description of a preferred embodiment wherein:

BRIEF DESCRIPTION OF THE DRAWINGS

FIG. 2 shows an arrangement for carrying out a preferred embodiment of the apparatus and method of the invention;

FIGS. 6, 7 and 8 show further embodiments of the apparatus and method of the invention.

DESCRIPTION OF THE PREFERRED EMBODIMENTS

Figure 1:
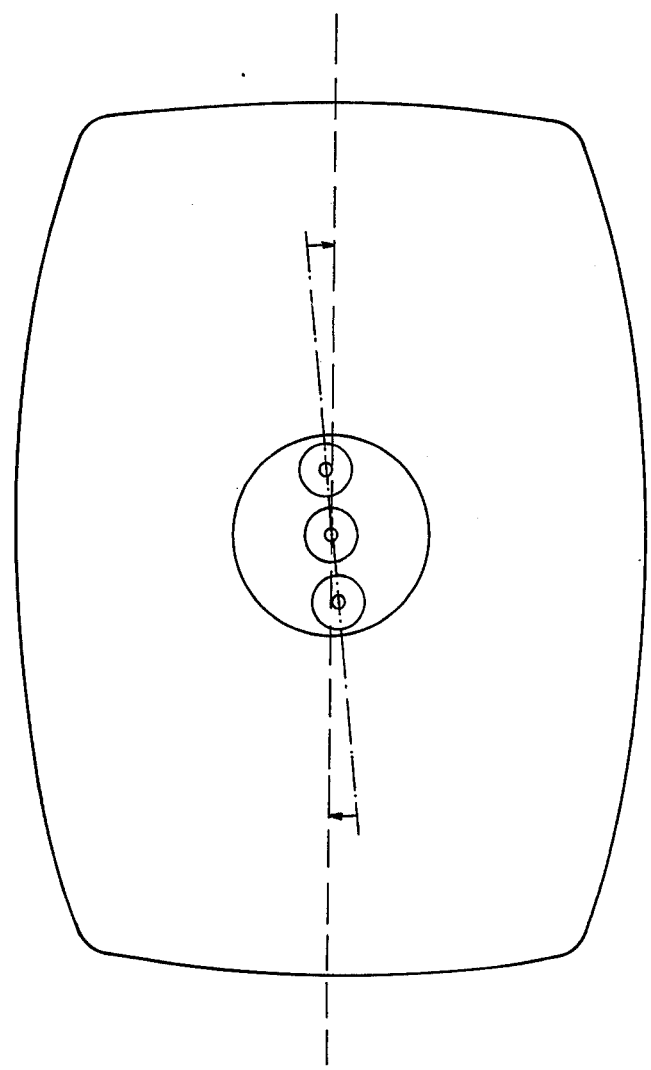
FIG. 1 illustrates the necessary alignment of the horizontal axis of the electron-gun system to the horizontal axis of the screen.

FIG. 1 illustrates the necessary alignment of the horizontal axis of the electron-gun system to the horizontal axis of the screen by the example of an in-line color tv picture tube. In this drawing, behind a merely outlined screen with shadow mask, and on a considerably enlarged scale, three electron guns arranged in one plane, are seen in a front view. The horizontal axis of the electron-gun system, indicated by the dot-and-dash line, extends through the apertures in the Wehnelt-cylinders of the system. The horizontal axis of the screen, indicated by the dashline in the drawing, is to extend in parallel with the lines of the television picture. Accordingly, the glass base with the electron-gun system as mounted thereon, has to be turned into the corresponding position before the glass base is sealed to the neck portion of the picture tube, so that the horizontal axis of the gun system will coincide with the horizontal axis of the screen.

FIG. 2 illustrates an exemplary arrangement for carrying out a preferred embodiment of the method and apparatus according to the invention. Not shown in the drawings is the glass-to-metal sealing device as such, to which the picture tube and the electron gun system as connected to the pressed glass base, are arranged separately from one another. The electron gun system is firmly placed on a spindle capable of rotating about its shaft. This shaft and the picture tube axis are in agreement with one another. On a further shaft extending vertically in relation to the aforementioned shaft, and intersecting the latter, there is arranged on one side of the electron gun system, a light source 1 and, on the other side, a corresponding receiver 2 at a certain distance therefrom. In this way the light source and the receiver or the electron gun system are prevented from mutually touching one another respectively. The light source preferably transmits light within the infrared range because this light is less sensitive to environmental influences than visible light which, however, is likewise suitable for being used, in which case there are wide possibilities of using or selecting optical transmitters and receivers. The light source is positioned within the focal point of a collimator lens 3. In front of this there is arranged a diaphragm 4 with a rectangular opening having a lateral length of about 7 by 10 mm. From this there will result a restricted directional light beam 5 impinging upon the electron gun system at the level of the convergence pot 6. The convergence pot is provided with two oppositely arranged marks 7 and 8 having the shape of, e.g., rectangular openings with lateral lengths of about 1.2 by 2 mm. When the line connecting the center points of these openings coincides with the axis 9 extending from the light source 1 to the receiver 2, the electron gun system is exactly aligned with respect to the phosphor dots on the scree-plate. The light beam 10 as passing through the openings 7 and 8, after having passed through a further diaphragm 11 and an edge filter 12 only permitting the passage of light originating with the light source 1, but filtering stray, diffused and ambient light, impinges upon a second collimator lens 13 in the focal point of which the receiver 2 is positioned. Owing to certain manufacturing tolerances when assembling the electron gun system to the pressed glass base, it is possible that the convergence pot shows to have a parallel offset in relation to the axis 9. In such a case, the collimator lens 13 takes care of that the light beam 10 which is then likewise offset, and passes through the openings 7 and 8, will in spite of this meet upon the same point of the sensor at the receiver. This is of advantage because it has proved that large-surface sensors do not have a constant sensitivity throughout their entire surface. In order to have a further possibility of avoiding falsifications of the light beam arriving at the receiver, there is used light which is modulated as to intensity or frequency. The intensity of the light beam impinging upon the receiver is a measure of accuracy of the position of the electron gun system in relation to the picture tube, and this intensity is dependent upon the cross-sectional surface area of the light beam 10 as passing through the openings. This value is then compared, e.g., in the receiver, with an applied rated value which is likewise derived from the same light source.

Figure 3:
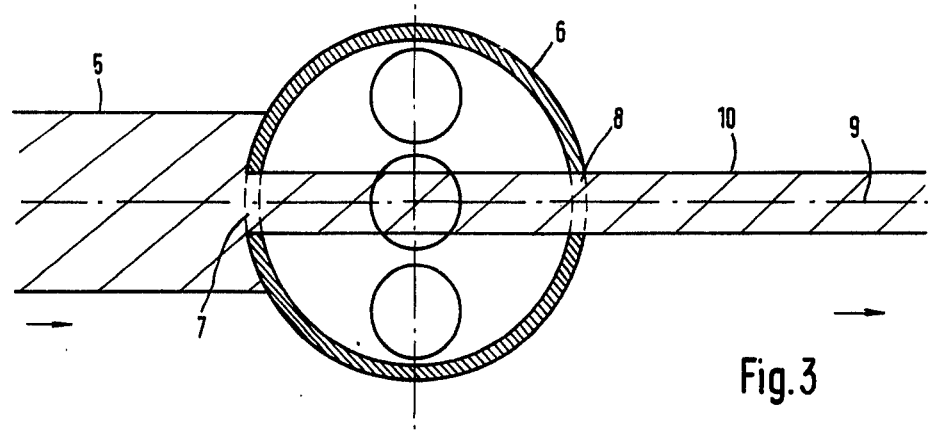
FIGS. 3 and 4 are illustrative of a particular detail of FIG. 1 in an enlarged scale.

FIG. 3 illustrates the case in which the electron gun system assumes the exact position (ideal position) with respect to the picture tube. The light beam 10 as emerging from the convergence pot 6 through the opening 8 then has its largest possible cross-section; accordingly, also the intensity at the receiver is at its maximum value. A parallel offset of the convergence pot with respect to the axis 9 is permitted, because this offset is being compensated for by the use of the second collimator lens 13.

Figure 4:
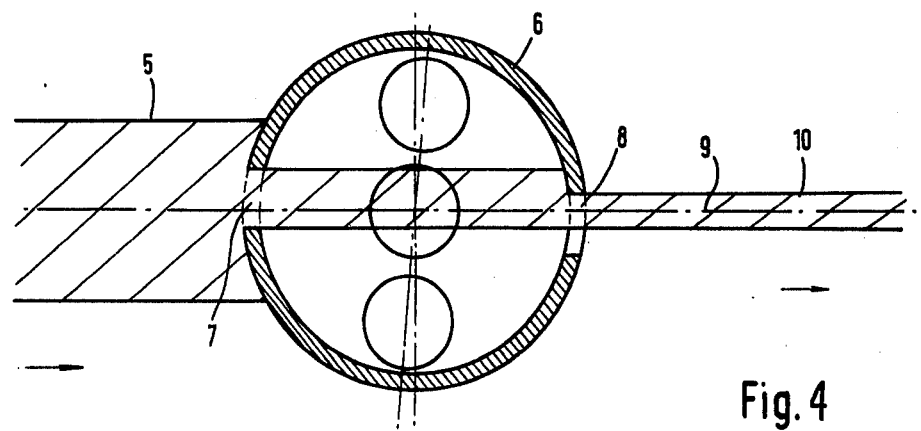

FIG. 4 illustrates the case in which the convergence pot is turned about its longitudinal centerline axis, i.e., in the present representation in the clockwise direction. The width of the light beam 10 is reduced by a lateral displacement of the edges of the openings 7 and 8, thus also the cross-sectional surface area of the light beam is reduced and, consequently, the intensity thereof.

Figure 5:
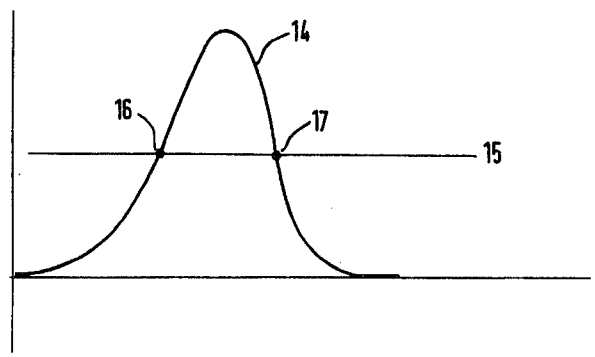
FIG. 5 shows the intensity curve relating to the light beam in the receiver as a function of the angle of rotation of the electron gun system.

By turning the electron gun system about its longitudinal centerline axis, there is intersected the intensity curve 14 (see FIG. 5). The point of maximum and, consequently, the ideal position of the electron gun system is obtained in that the intensity is preceded by a threshold value 15, that with the aid of a suitable electronic circuit there is determined the position of the points 16 and 17 the straight line characterizing the threshold value, intersecting the intensity curve 14, and by electronically ascertaining the distance between the two points. 15

An improvement in determining the position of the maximum of the intensity is possible in that the intensity curve is electronically differentiated, so that the maximum will be obtainable at the zero (0)-pitch point.

The use of a threshold value of the intensity still offers a further advantage. If this value is not reached when intersecting the intensity curve, hence when this will remain below this value, then this is an indication saying that some fault or other has occurred in the system or the assembly thereof. The light beam may impinge too to far at the rim portion of the convergence pot, there might exist a soiling of the system, or the like. In any case, an exact alignment of the electron gun system is no longer safeguarded. A corresponding layout of the electronic evaluating circuit and the installation of an optical or acoustical warning system permits an early detection of faults, so that it is possible to reject such electron gun systems which do not longer meet the quality requirements. The following manufacturing steps, such as pumping, melting, gettering and testing of faulty picture tubes or picture tubes with a built-in faulty electron gun system is thus omitted, resulting in a considerable cost saving.

Of course, it is also possible to provide the openings for the passage of the light beam in one of the grids of the electron gun system. In so doing, however, variations of the electrostatic characteristic values thereof would have to be taken into account, which to a substantially smaller extent, is the case when the openings are provided for in the convergence pot.

In a further embodiment which will now be described with reference to FIG. 6, there are used two light beams 18 and 19 which are directed and intersect one another at a smaller angle. The electron gun system and, consequently, the convergence pot are successively brought into the direction of these light beams by way of turning. In this way, the associated light beams as emerging through the opening 8, are successively imaged on the receiver by means of a collecting lens 20. At the receiver, when intersecting the intensity curve, there will be obtained two maximum values. From dividing in half the distance between these maximum values, there will result the ideal position of the electron gun system.

The two aforedescribed methods may be referred to as ray-penetration methods. In the embodiment described with reference to FIG. 7, in distinction thereto, they might be referred to as a reflection method. The marks 21 and 22 are provided for in the form of, e.g., reflection-reducing coatings which may have the shape of any suitable symbols, on the outsides of, e.g., oppositely arranged parts of the electron gun system. Also, in this case there is preferably chosen the convergence pot 6. Since there are not used any openings changing the electrical data, also, e.g., the grids may serve as the locations for attaching these marks. On both sides of the electron gun system there is each time arranged one light source 23, 24 and one receiver 25, 26 in such a way that the light beams as transmitted by the light sources, and of which in this drawing there are only shown the axes, will impinge upon the marks 21 and 22 at an angle, with the reflected light beams reaching the respective receiver. When the electron gun system is turned by an angle $\Delta\alpha$ with respect to the ideal position, then the angular variation of the reflected light beam will amount to $2\Delta\alpha$. This indicates an increased fault sensitivity of the arrangement. In cases where the marks are provided for in the form of reflection-reducing layers, the ideal position of the electron gun system is reached when the intensity of the reflected light beam in the receiver reaches its minimum.

FIG. 8 shows a further example of the reflection method embodiment of the invention. The reflected marks 21 and 22 are illuminated by diffused light, and imaged on columns in diaphragms 29, 30 with the aid of the lenses 27, 28. The receivers 31, 32 are positioned behind these columns. In the case of a good alignment, the intensity maximum will be simultaneously reached in both receivers. In the event of a parallel offset of the electron gun system, the intensity maxima are indicated successively and in dependence upon the turning degree thereof. The distance of the intensity maxima referred to the angle of rotation serves as a direct measure of the parallel offset. The ideal position will result when dividing in half the angle of rotation between the intensity maxima.

It is possible to provide the marks with a code, by arranging e.g. several slots or symbols in graduated sizes next to each other. The variation of the intensity of the light rays in the receiver may then be utilized, with the aid of a suitable electronic circuit, to produce pulses for indicating the respectively required direction of turning of the electron gun system for the purpose of reaching its ideal position.

We claim:

1. A method of aligning the electron gun system of a multi-cathode-ray tube, such as in a color television picture tube, with respect to the phosphor dots on the screen-plate thereof, in which the electron gun system which includes a plurality of guns, as well as the picture tube, prior to the assembly, are separated from one another and positioned for sealing and in which the electron gun system is supported and is capable of being rotated about its longitudinal centerline axis, and is provided with position marks which are utilized for defining the relative position between the picture tube and the electron gun system prior to the sealing thereof, comprising the steps of:

providing optically effective position marks on the electron gun system;

illuminating and traversing said marks by one or more light sources;

measuring the light impinging upon said marks with the aid of one or more receivers opposite to said light source by deriving an indication of a maximum value of light intensity when the electron gun system is properly aligned; and correcting the position of the electron gun system in accordance with said measurement.

2. A method according to claim 1, wherein the marks on the electron gun system are in the shape of reflectors and serve to reflect the transmitted light, and wherein one or more receivers measure the received light.

3. A method according to claim 1, wherein the wavelength of the light provided by said light sources is within the visible light spectrum.

4. A method according to claim 1, wherein the wavelength of the light provided by said light sources is within the infrared spectrum.

5. A method according to claim 1, wherein said measurement is derived by a nominal-actual comparison between the light intensity applied to the receivers via the marks and a fixed predetermined threshold value given to said receivers.

6. A method according to claim 5, wherein said predetermined threshold value in said receiver consists of a signal of given intensity derived from the same light source which is applied to the receiver via an interference-free signal path.

7. A method according to claim 1, wherein the light provided by said light sources is frequency-modulated.

8. A method according to claim 1, wherein the light provided by said light sources is intensity-modulated.

9. A method according to claim 1, wherein the light transmitted by the light source is formed to the shape of a directional light beam whose cross-section is larger than that of said marks, said marks consisting of columns or slots and, wherein a portion of the light beam is directed to pass through the columns or slots, and to impinge upon the receiver, and wherein the electron gun system, with respect to the screen plate as determined by the position of said marks, is in alignment when the axis as extending through the columns or slots is in parallel with the axis of the directional light beam or coincides therewith.

10. A method according to claim 1, wherein two directional light beams whose cross-section is larger than that of said marks, said marks consisting of columns or slots, impinge upon the electron gun system at a defined small angle in relation to one another, that upon rotating the electron gun system about its longitudinal centerline axis, the light beams successively are directed to pass through the columns or slots, and impinge upon the receiver.

11. A method according to claim 1, wherein the marks are configured to have the shape of a code, such that the magnitude and direction of the variation in intensity of the light beam at the receiver is a measure of the required direction of rotation of the electron gun system for achieving a predetermined alignment.

12. Apparatus for aligning the electron gun system of a multi-cathode-ray tube, such as a color television picture tube, with respect to the phosphor dots on the screen-plate thereof, in which the electron gun system includes a plurality of electron guns, as well as the picture tube, prior to the assembly, are separated from one another and positioned for sealing, and in which the electron gun system is supported and is capable of being rotated about its longitudinal centerline axis, and is provided with position marks which are utilized for defining the relative position between the picture tube and the electron gun system prior to the sealing-in thereof, comprising:
  optically effective position marks on the electron gun system;
  means for illuminating said marks including one or more light sources;
  means for receiving the light as impinging upon said marks for measuring the light intensity; and
  means for correcting the position of the electron gun system in dependence upon said measured result.

13. Apparatus according to claim 12, wherein said marks provided on the electron gun system are configured as slots or columns, and are traversed by the light beam, and wherein said receiving means is on the side opposite the light source, and includes means for indicating a maximum value representative of light intensity when the electron gun system is aligned.

14. Apparatus according to claim 12 wherein the marks on the electron gun system are configured in the shape of reflectors for reflecting the transmitted light, and further comprising one or more receiving means for measuring the light impinging thereon.

15. Apparatus according to claim 12 wherein the wavelength of the light from said light sources is within the visible light spectrum.

16. Apparatus according to claim 12 wherein the wavelength of the light from said light sources is within the infrared spectrum.

17. Apparatus according to claim 12 wherein said receiving means includes means for deriving nominal-actual comparison between the light intensity applied to the receivers via the marks and a fixed predetermined threshold value given to said receivers.

18. Apparatus according to claim 17 wherein said threshold value in the receiver consists of a signal of given intensity derived from the same light source which is applied to the receiver via an interference-free signal path.

19. Apparatus according to claim 12 wherein said light provided by said light sources is frequency-modulated.

20. Apparatus according to claim 12 wherein said light provided by said light sources is intensity-modulated.

21. Apparatus according to claim 13 further comprising means for forming the light transmitted by the light source into the shape of a directional light beam having a cross-section larger than the cross-section of the columns or slots, such that a portion of the light beam is directed to pass through the columns or slots, and to impinge upon the receiver, such that the electron gun system, is in predetermined alignment when the axis as extending through the columns or slots, is in parallel with the axis of the directional light beam.

22. Apparatus according to claim 13, further comprising means for providing two directional light beams having cross-sections larger than that of the columns or slots;
  means for impinging said light beams upon the electron gun system at a defined small angle with respect to one another; and
  means for rotating the electron gun system about its longitudinal centerline axis, such that the light beams successively are directed to pass through the columns or slots, to impinge upon the receiver.

23. Apparatus according to claim 12 wherein said marks are configured to have the shape of a code, such that the magnitude and direction of the variation in intensity of the light beam at the receiver is a measure of the required direction of rotation of the electron gun system for achieving a predetermined alignment.

* * * * *

UNITED STATES PATENT AND TRADEMARK OFFICE
CERTIFICATE OF CORRECTION

PATENT NO. : 4,148,117
DATED : April 10, 1979
INVENTOR(S) : Pieter Bracke, Dieter Forker, Dieter Kropsch It is certified that error appears in the above-identified patent and that said Letters Patent are hereby corrected as shown below:

On the cover sheet (Abstract page), at [54] (Title), please delete "BUN" and insert therefor --GUN--.

Also, in the Title at column 1, please delete "BUN" and insert therefor --GUN--.

Signed and Sealed this

Eleventh Day of March 1980

[SEAL]

Attest:

SIDNEY A. DIAMOND

*Attesting Officer*  *Commissioner of Patents and Trademarks*